United States Patent
Oshida et al.

(10) Patent No.: US 9,294,657 B2
(45) Date of Patent: Mar. 22, 2016

(54) VEHICULAR IMAGING DEVICE

(71) Applicant: HONDA MOTOR CO., LTD., Minato-Ku, Tokyo (JP)

(72) Inventors: Kei Oshida, Wako (JP); Takashi Watanabe, Wako (JP); Haruhiko Nishiguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/420,717

(22) PCT Filed: Aug. 7, 2013

(86) PCT No.: PCT/JP2013/071337
§ 371 (c)(1),
(2) Date: Feb. 10, 2015

(87) PCT Pub. No.: WO2014/027587
PCT Pub. Date: Feb. 20, 2014

(65) Prior Publication Data
US 2015/0195435 A1 Jul. 9, 2015

(30) Foreign Application Priority Data
Aug. 13, 2012 (JP) ................................ 2012-179487

(51) Int. Cl.
*H04N 5/225* (2006.01)
*B60R 11/04* (2006.01)
(Continued)

(52) U.S. Cl.
CPC ............... *H04N 5/2252* (2013.01); *B60R 1/12* (2013.01); *B60R 11/04* (2013.01); *H04N 5/2251* (2013.01); *H04N 5/2253* (2013.01); *H04N 5/2254* (2013.01); *B60R 2001/1253* (2013.01); *B60R 2011/004* (2013.01); *B60R 2011/0043* (2013.01); *B60R 2300/802* (2013.01); *B60R 2300/8066* (2013.01)

(58) Field of Classification Search
CPC . H04N 5/2251; H04N 5/2252; H04N 5/2253; H04N 5/2254; B60R 11/04
See application file for complete search history.

(56) References Cited

U.S. PATENT DOCUMENTS

| 7,391,014 B2 | 6/2008 | Saccagno |
| 8,208,023 B2 | 6/2012 | Asai |
| 2003/0098908 A1* | 5/2003 | Misaiji ...................... B60R 1/00 348/148 |

(Continued)

FOREIGN PATENT DOCUMENTS

| JP | 2000-016181 A | 1/2000 |
| JP | 2006-525896 A | 11/2006 |

(Continued)

*Primary Examiner* — Roberto Velez
*Assistant Examiner* — Abdelaaziz Tissire
(74) *Attorney, Agent, or Firm* — Carrier Blackman & Associates, P.C.; Joseph P. Carrier; Jeffrey T. Gedeon

(57) ABSTRACT

A vehicular imaging device is formed by housing a camera, which takes an image of one side and rearwardly of a vehicle body, in an interior of a minor housing of the door mirror. Since an objective lens of the camera is disposed further inside than the outer surface of the mirror housing, it is possible to prevent raindrops or snow flowing from top to bottom along the outer surface of the mirror housing by virtue of gravity or raindrops or snow flowing from front to rear along the outer surface of the mirror housing due to being pushed by air flow from adhering to the objective lens of the camera, thereby enabling the image taking function of the camera to be maintained.

2 Claims, 4 Drawing Sheets

(51) Int. Cl.
*B60R 1/12* (2006.01)
*B60R 11/00* (2006.01)

(56) References Cited

U.S. PATENT DOCUMENTS

| | | | |
|---|---|---|---|
| 2003/0214733 A1* | 11/2003 | Fujikawa | B60R 1/00 359/838 |
| 2004/0121820 A1* | 6/2004 | Unno | B60R 1/06 455/569.2 |
| 2005/0140785 A1* | 6/2005 | Mazzilli | B60R 1/12 348/148 |
| 2007/0023611 A1* | 2/2007 | Saccagno | B60R 1/12 250/208.1 |
| 2010/0165100 A1* | 7/2010 | Asai | B60R 1/00 348/135 |
| 2010/0196000 A1* | 8/2010 | Watanabe | B60R 1/12 396/429 |
| 2014/0063245 A1* | 3/2014 | Bowers | B60R 1/0607 348/148 |

FOREIGN PATENT DOCUMENTS

| | | |
|---|---|---|
| JP | 2007-314042 A | 12/2007 |
| JP | 2008-296789 A | 12/2008 |
| JP | 2009-093882 A | 4/2009 |

* cited by examiner

VEHICULAR IMAGING DEVICE

TECHNICAL FIELD

The present invention relates to a vehicular imaging device in which a camera that takes an image of one side and rearwardly of a vehicle body is housed in an interior of a minor housing of a door minor.

BACKGROUND ART

An arrangement in which a camera is housed in the interior of a door minor of an automobile and the condition of the road surface in the vicinity of a front wheel can be ascertained by taking an image using the camera is known from Patent Document 1 below.

The camera described in Patent Document 1 is one for taking an image of a region that is in a driver's blind spot, and is called a blind spot monitor; other than this, an arrangement in which a lane watch camera for taking an image of a white line, etc. on a road surface or a multi-view camera equipped with a fish eye lens having a large angle of view is housed in the interior of a door minor is known.

RELATED ART DOCUMENTS

Patent Documents

Patent Document 1: Japanese Patent Application Laid-open No. 2009-93882

SUMMARY OF THE INVENTION

Problems to be Solved by the Invention

In the arrangement described in Patent Document 1 above, since the objective lens of the camera is provided so as to project downwardly from the underside of the minor housing, there is a possibility that raindrops or snow flowing from top to bottom along the outer surface of the minor housing by virtue of gravity or raindrops or snow flowing from front to rear along the outer surface of the mirror housing due to being pushed by means of air flow will adhere to the objective lens of the camera, and it will not be possible to obtain a clear image.

The present invention has been achieved in light of the circumstances above, and it is an object thereof to prevent raindrops or snow from adhering to an objective portion of an imaging device provided on a door mirror.

Means for Solving the Problems

In order to attain the above object, according to a first aspect of the present invention, there is provided a vehicular imaging device in which a camera that takes an image of one side and rearwardly of a vehicle body is housed in an interior of a mirror housing of a door mirror, wherein an objective portion of the camera is disposed further inside than an outer surface of the minor housing.

Further, according to a second aspect of the present invention, in addition to the first aspect, an image taken by the camera has an angle of view of less than 180°.

Furthermore, according to a third aspect of the present invention, in addition to the first or second aspect, a conical recess portion is formed in the outer surface of the mirror housing, and the objective portion is disposed at a bottom of the recess portion.

Moreover, according to a fourth aspect of the present invention, in addition to the third aspect, the minor housing comprises a bulge portion having the recess portion formed therein, a substantially horizontal bottom wall connected to the bulge portion, and a side wall rising from an outer end in a vehicle width direction of the bottom wall via a substantially right angled corner portion.

It should be noted here that an objective lens 18b of an embodiment corresponds to the objective portion of the present invention.

Effects of the Invention

In accordance with the first aspect of the present invention, the vehicular imaging device is formed by housing the camera, which takes an image of one side and rearwardly of the vehicle body, in the interior of the minor housing of the door mirror. Since the objective portion of the camera is disposed further inside than the outer surface of the mirror housing, it is possible to prevent raindrops or snow flowing from top to bottom along the outer surface of the minor housing by virtue of gravity or raindrops or snow flowing from front to rear along the outer surface of the minor housing due to being pushed by means of air flow from adhering to the objective portion of the camera, thereby enabling the image taking function of the camera to be maintained.

Furthermore, in accordance with the second aspect of the present invention, since the camera takes an image with an angle of view of less than 180°, it is possible to use a standard inexpensive camera, thus cutting the cost.

Moreover, in accordance with the third aspect of the present invention, since the conical recess part is formed in the outer surface of the mirror housing, and the objective portion is disposed at the bottom of the recess part, it is possible to prevent the image region taken by the camera from being shielded by the minor housing while enabling the objective portion of the camera to be disposed on the inside relative to the outer surface of the mirror housing.

Furthermore, in accordance with the fourth aspect of the present invention, since the minor housing includes the bulge portion having the recess part formed therein, the substantially horizontal bottom wall connected to the bulge portion, and the side wall rising from the outer end in the vehicle width direction of the bottom wall via the substantially right angled corner portion, it is possible to prevent raindrops or snow flowing down along the side wall of the minor housing from dropping down from the corner portion and going around it toward the bottom wall side, thus making it difficult for raindrops or snow to flow into the recess part provided in the bulge portion of the bottom wall.

EXPLANATION OF REFERENCE NUMERALS AND SYMBOLS

Figure 1:
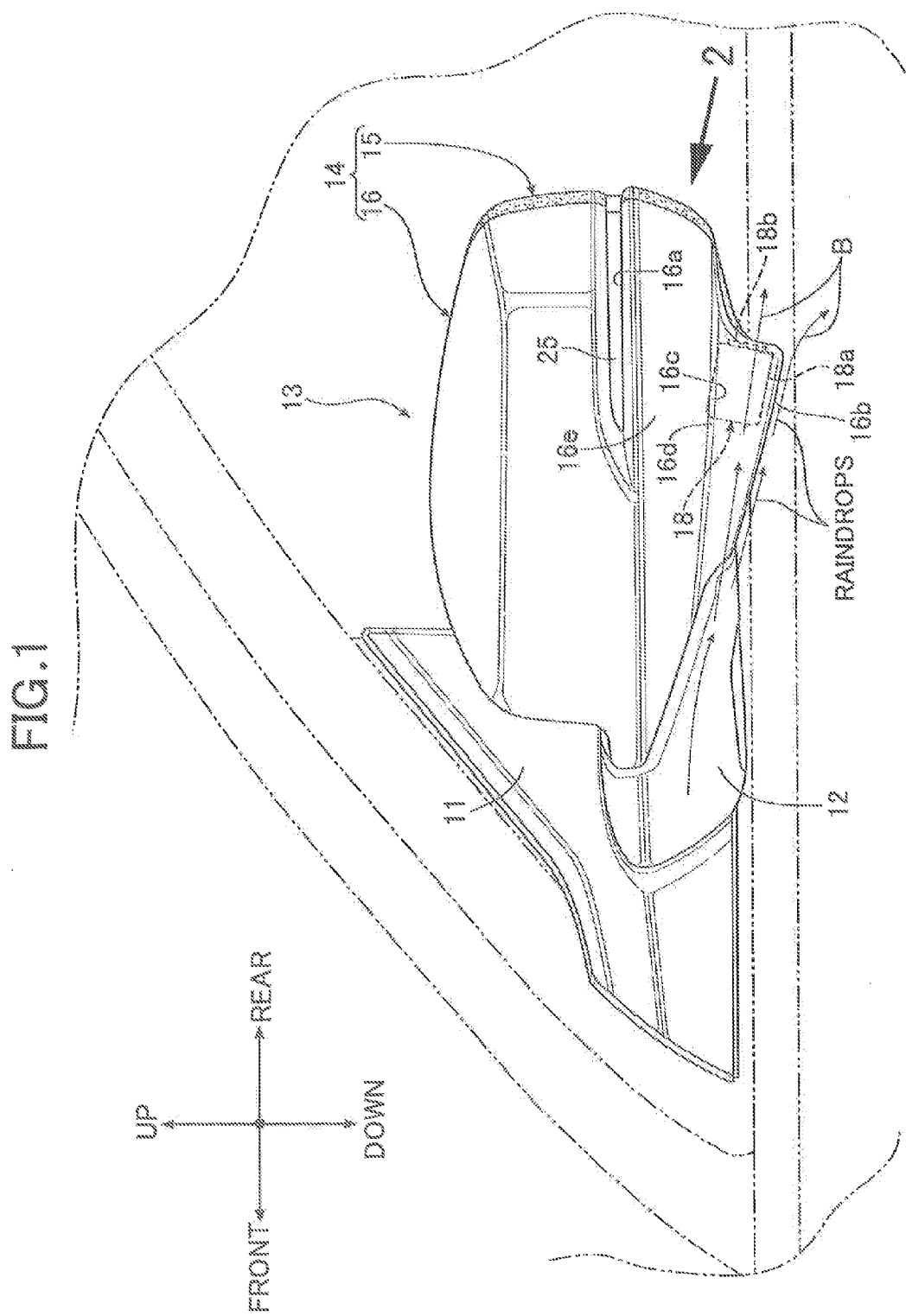
FIG. 1 is a side view of a door mirror (first embodiment).

13 Door minor
14 Mirror housing
15a Bulge portion

15b Recess portion
16c Bottom wall
16d Corner portion
16e Side wall
18 Camera
18b Objective lens (objective portion)

Mode for Carrying out the Invention

A mode for carrying out the present invention is explained below by reference to FIG. 1 to FIG. 4.

First Embodiment

Figure 2:
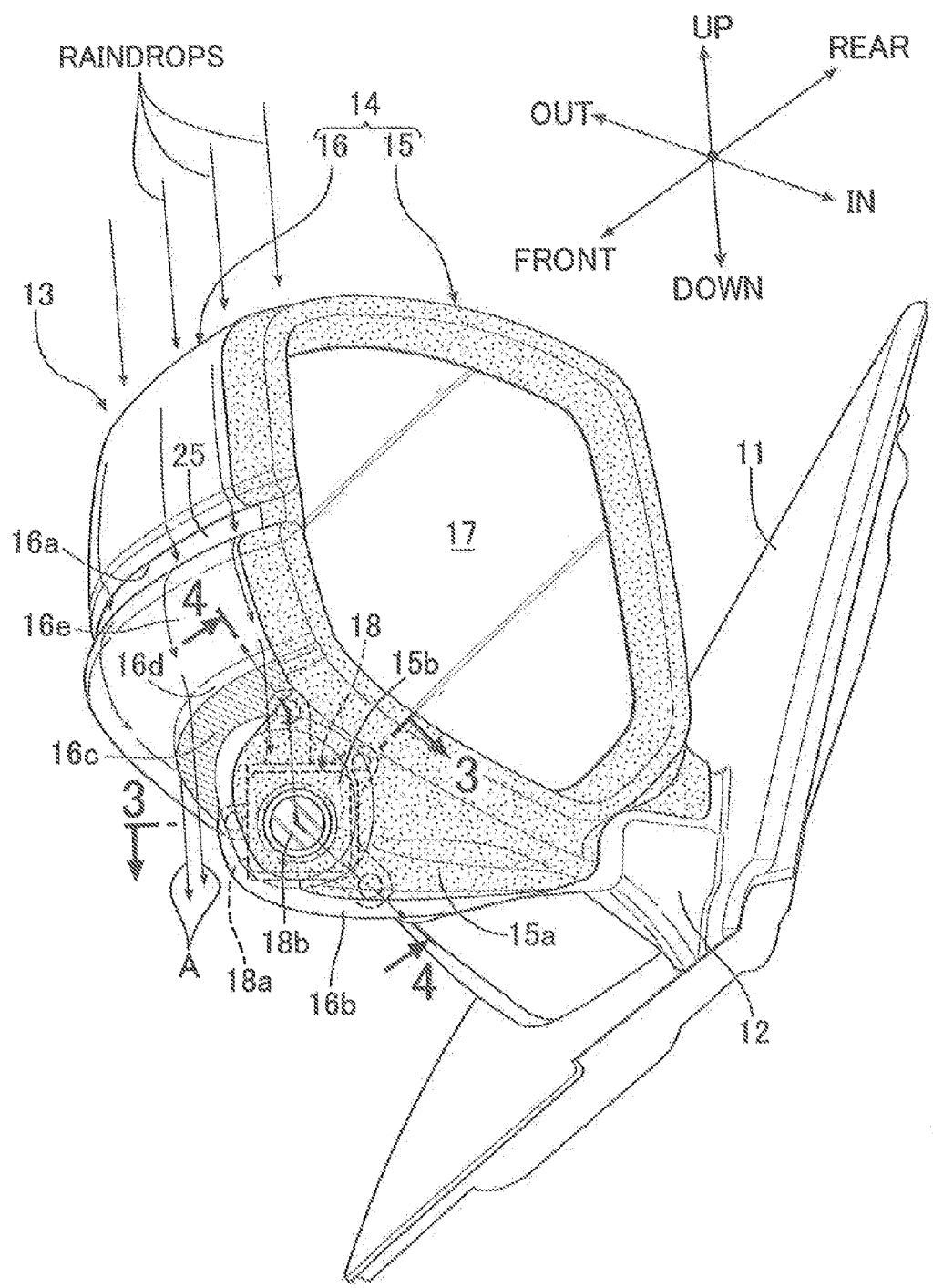
FIG. 2 is a view in the direction of arrow 2 in FIG. 1 (first embodiment).

As shown in FIG. 1 and FIG. 2, a minor support part 12 is provided on a triangular base plate 11 fixed to a forward area of a door glass of a front door, and a door mirror 13 is supported on the mirror support part 12 so as to protrude outside in the vehicle width direction, the door mirror 13 being one for a driver to visually check a region to the rear of the vehicle body. The door mirror 13 can be made to swing relative to the minor support part 12 by means of a retraction mechanism, which is not illustrated, and can be retracted to a position along the door glass so that it does not interfere with parking, etc.

A mirror housing 14 forming an outer shell of the door minor 13 is formed by joining, via a seal member, a rear housing 15 positioned on a side to the rear of the vehicle body and a front housing 16 positioned on a side to the front of the vehicle body. In FIG. 1 and FIG. 2, the rear housing 15 is shown by shading. The rear housing 15 is formed into an elliptical frame shape, and a mirror 17 is supported so as to be fitted into an opening thereof. The mirror 17 can be made to swing in the vertical direction and the lateral direction relative to the rear housing 15 by means of an angle adjustment mechanism, which is not illustrated, such that an appropriate rearward view can be obtained regardless of difference in the driver's seated height or seating attitude.

A bulge portion 15a protrudes downwardly from the lower edge of the rear housing 15, and a conical recess portion 15b is formed integrally with an outer end in the vehicle width direction of the bulge portion 15a. An axis L of the conical recess portion 15b is tilted so that in plan view the front is directed toward the inside in the vehicle width direction and the rear is directed toward the outside in the vehicle width direction, and the recess portion 15b increases in angle in going toward the rear of the vehicle body. It is necessary for the angle of the apex of the conical recess portion 15b to be less than 180°, and in the present embodiment it is 105°. Furthermore, the depth of the recess portion 15b is 5 mm to 7 mm in the shallowest part.

A camera 18 mounted in the interior of the bulge portion 15a of the rear housing 15 of the mirror housing 14 includes a camera main body 18a formed into a rectangular tube shape, and a circular objective lens 18b is provided on one end part of the camera main body 18a. The camera 18 is one that is used as a blind spot monitor, and takes an image of, for example, a blind spot of the door minor or the blind spot plus a range that can be seen by the door mirror and shows the image on its display, and is fixed to the rear housing 15 via a rear camera holder 19 and a front camera holder 20 in a state in which the objective lens 18b is directed to one side and rearwardly of the vehicle body.

Figure 3:
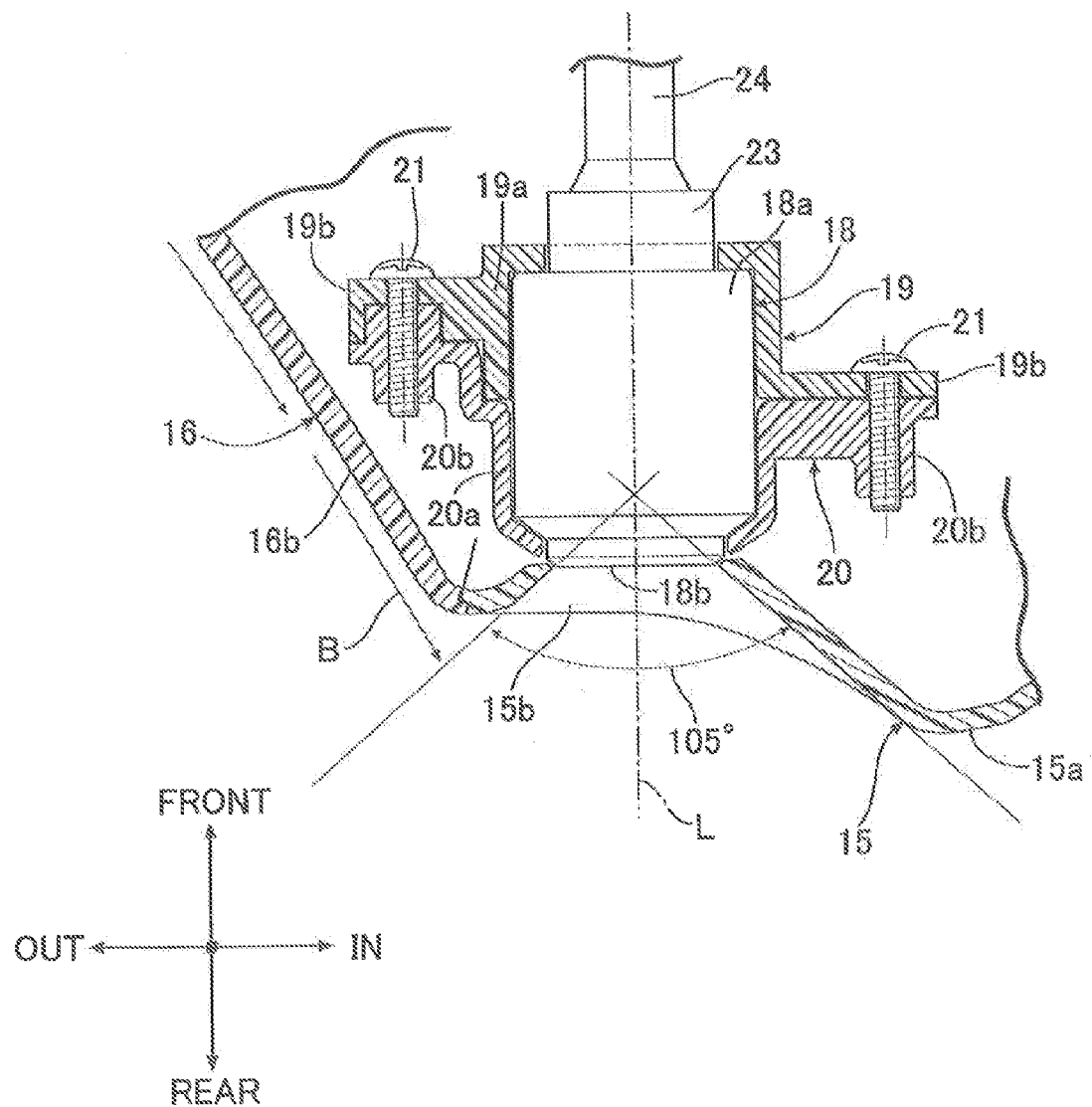
FIG. 3 is a sectional view along line 3-3 in FIG. 2 (first embodiment).
Figure 4:
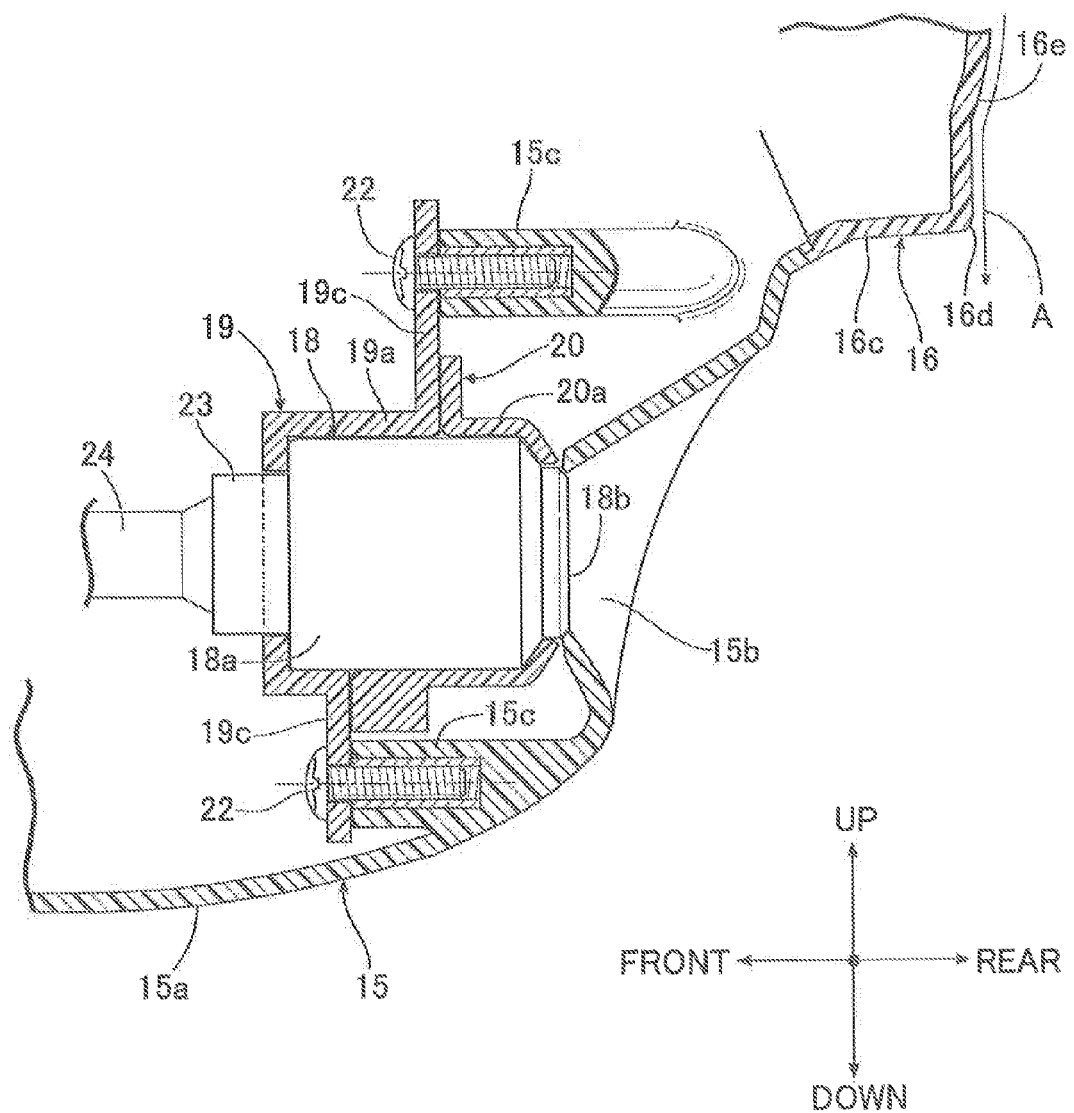
FIG. 4 is a sectional view along line 4-4 in FIG. 2 (first embodiment).

That is, as is clear from FIG. 3 and FIG. 4, in a state in which the camera main body 18a is sandwiched between a main body portion 19a of the rear camera holder 19 and a main body portion 20a of the front camera holder 20 from the front and the rear, two joining portions 19b and 19b of the rear camera holder 19 and two joining portions 20b and 20b of the front camera holder are secured integrally by means of two bolts 21 and 21 (see FIG. 3). Two mounting brackets 19c and 19c extending from the main body portion 19a of the rear camera holder 19 are secured to boss portions 15c and 15c of the rear housing 15 by means of two bolts 22 and 22, thus fixing the camera 18 to the rear housing 15 (see FIG. 4). A lead 24 is connected to an end part, on the side opposite to the objective lens 18b, of the camera main body 18a via a connector 23.

Referring back to FIG. 1 and FIG. 2, the front housing 16 is a bowl-shaped member with its rear face open, and a side turn lamp 25 is fitted into a slit 16a formed in an outer end part in the vehicle width direction and extending in the horizontal direction. Furthermore, a bulge portion 16b extending outside in the vehicle width direction protrudes downwardly on the underside of the front housing 16, and this bulge portion 16b forms a half cone shape in cooperation with the bulge portion 15a of the rear housing 15 and houses the camera 18 in the interior.

The camera 18 thus mounted takes an image downwardly to the rear of the vehicle body, which is a blind spot for the driver even using the door minor 13, and shows this image on a display within a vehicle compartment, thus enabling the driver to safely and easily put the vehicle in a garage, etc.

The mirror housing 14 formed by joining the rear housing 15 and the front housing 16 includes a bottom wall 16c (see hatched area of FIG. 2) protruding in the horizontal direction above the recess portion 15b and also includes a side wall 16e extending upwardly via a corner portion 16d bent at substantially right angles from the outer end in the vehicle width direction of the bottom wall 16c, and the recess portion 15b in which the objective lens 18b of the camera 18 is positioned is disposed beneath the bottom wall 16c.

The operation of the embodiment of the present invention having the above arrangement is now explained.

When an automobile is stopped or travels at low speed, if raindrops or snow (hereinafter, also referred to as raindrops, etc.) falling on the mirror housing 14 of the door minor 13 flow downwardly by virtue of gravity and adhere to the objective lens 18b of the camera 18, there is the problem that an image taken by the camera 18 will become unclear. However, in accordance with the present embodiment, raindrops, etc. that have flowed downwardly along the outer surface of the side wall 16e of the front housing 16 of the minor housing 14 drop downwardly from the corner portion 16d, which is bent at substantially right angles (see arrow A in FIG. 2 and FIG. 4), and are prevented from going around it toward the substantially horizontal bottom wall 16c of the front housing 16 from the corner portion 16d. As a result, it becomes difficult for raindrops, etc. to adhere to the objective lens 18b of the camera 18 exposed in the bottom of the recess portion 15b of the rear housing 15 connected to the bottom wall 16c, thus enabling a clear camera image to be obtained.

Furthermore, even if some of the raindrops, etc that have flowed down along the outer surface of the side wall 16e of the front housing 16 pass through the corner portion 16d bent at right angles and go around it toward the substantially horizontal bottom wall 16c of the front housing 16, since the objective lens 18b of the camera 18 is positioned at the bottom of the recess portion 15b, which is recessed in a cone shape from the outer surface of the rear housing 15, it becomes difficult for rain water, etc. that has gone around the bottom wall 16c to adhere to the objective lens 18b of the camera 18, thus enabling a clear camera image to be obtained.

Moreover, when the automobile is traveling at high speed, although rain water, etc. adhering to the front housing 16 is made to flow from the front to the rear on the outer surface of the bulge portion 16b by means of air flow, since the objective lens 18b of the camera 18 is positioned at the bottom of the recess portion 15b, which is recessed in a cone shape from the rear end of the bulge portion 16b, it becomes difficult for rain water, etc. that has gone around the bottom wall 16c to adhere to the objective lens 18b of the camera 18 (see arrow B in FIG. 1 and FIG. 3), thus enabling a clear camera image to be obtained.

As hereinbefore described, in accordance with the present embodiment, since the objective lens 18b of the camera 18 is disposed further inside than the outer surface of the mirror housing 14, it is possible to prevent raindrops, etc. that are made to flow from top to bottom on the surface of the mirror housing 14 by virtue of gravity or raindrops, etc. that are made to flow from front to rear on the surface of the mirror housing 14 due to being pushed by means of air flow from adhering to the objective lens 18b of the camera 18, thus enabling the image taking function of the camera 18 to be maintained.

Furthermore, the angle of the apex of the conical recess portion 15b formed in the surface of the mirror housing 14 is inevitably less than 180°, but since the camera 18 is a blind spot monitor having an angle of view of less than 180°, the recess portion 15b does not interfere so as to restrict the image region taken by the camera 18.

An embodiment of the present invention is explained above, but the present invention may be modified in a variety of ways as long as the modifications do not depart from the spirit and scope thereof.

For example, the objective portion of the present invention is not limited to the objective lens 18b of the embodiment and may be a transparent cover that covers the objective lens 18b.

Furthermore, in the embodiment, the camera 18 is fixed to the minor housing 14 via the front camera holder 19 and the rear camera holder 20, but any fixing structure may be used.

Moreover, the camera 18 of the embodiment has an angle of view of less than 180°, but a camera having an angle of view of 180° or greater may be employed, and only part of the image (a portion with an angle of view of less than 180°) may be shown on a display. In addition, the camera 18 having an angle of view of less than 180° is generally inexpensive, and the cost may be cut by using same.

The invention claimed is:

1. A vehicular imaging device in which a camera that takes an image of one side and rearwardly of a vehicle body is housed in an interior of a mirror housing of a door mirror, wherein
    the mirror housing comprises a bulge portion. a substantially horizontal bottom wall connected to the bulge portion, and a side wall rising from an outer end of a vehicle width direction of the bottom wall via a substantially right angled corner portion,
    a conical recess portion is formed in the bulge portion and an objective portion of the camera is disposed at a bottom of the recess portion, wherein
    the recess portion is opened toward a rear of the vehicle body while being directed toward an outside in the vehicle width direction, and
    the bottom wall protrudes in a substantially horizontal direction above the recess portion.

2. The vehicular imaging device according to claim 1, wherein an image taken by the camera has an angle of view of less than 180°.

* * * * *